United States Patent Office 3,284,298
Patented Nov. 8, 1966

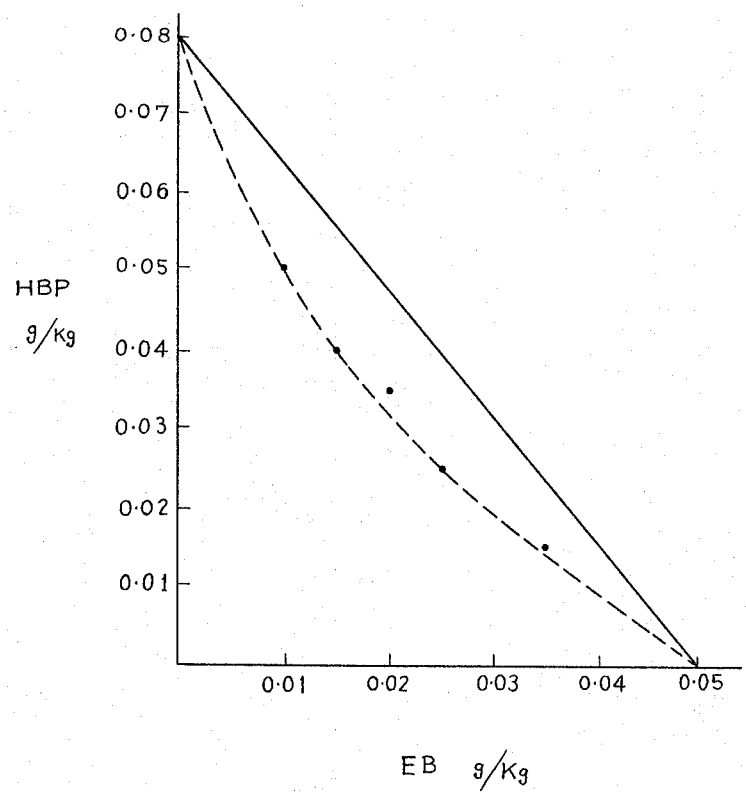

3,284,298
ANALGETIC COMPOSITIONS AND METHODS
Hajime Fujimura, 9–2 Shishigatani-shimo-miyanomae-cho, Sakyo-ku, Kyoto, Japan, and Kazuo Shinozaki, 10 Izumi-cho, Nishinomiya, Hyogo, Japan
Filed Sept. 23, 1963, Ser. No. 310,597
Claims priority, application Japan, Sept. 26, 1962, 37/42,261
12 Claims. (Cl. 167—65)

This invention relates to novel analgetic compositions which are very effective and, in comparison with hitherto-known analgesics, are relatively free of side-effects. More specifically, the invention relates to pharmaceutical compositions which contain β-hydroxybutyric acid p-phenetidide and ethoxybenzamide, and which may additionally contain vitamin $B_1$-active components, and/or other pharmaceutically acceptable ingredients.

Many kinds of antipyretic analgesics are known and have been used for eliminating or mitigating human pain such as headache, toothache, menstrual pain and so on. They can in general be administered not only as simplex medicaments but, more often, as compositions thereof compounded with one or more other analgesics, hypnotics, sedatives, analeptics, etc. in expectation of strengthening or enhancing the analgetic effect and of diminishing side-effects. However, the known analgetic compositions are mostly prepared after so-called "APC" formulation—i.e. a combination of acetylsalicylic acid or aminopyrine, phenacetin, and caffeine—and generally contain as a main ingredient either acetylsalicylic aicid or a pyrazolone-type medicament such as aminopyrine, sulpyrine (=sodium 1-phenyl-2,3-dimethyl-5-pyrazolone-4-methylaminomethanesulfonate), pyrabital (=aminopyrine diethylbarbiturate, a compound of 2 moles of aminopyrine and 1 mole of barbital) or the like. It is well-known that acetylsalicylic acid or a pyrazolone-type medicament often causes drug eruption when administered to patients, especially those sensitive to said medicament. Moreover, especially in the case of acetylsalicylic acid, patients taking the medicament periodically even for a little while, are apt to suffer from gastric troubles. It has therefore long been a desideratum among medical men and pharmacologists to embody novel and excellent antipyretic analgesics other than that of the so-called "APC" type.

The present invention, directed to the realization of this desideratum, is based upon an unexpectedly characteristic potentiation between β-hydroxybutyric acid p-phenetidide (hereinafter abbreviated as HBP) and ethoxybenzamide (hereinafter abbreviated as EB) in antipyretic and analgetic activities. Moreover, according to a further aspect of the invention, the characteristically potentiating effect is further enhanced by the presence of vitamin $B_1$-active substances.

It is therefore a principal object of the present invention to provide novel and effective analgesic compositions which comprise as main ingredients at least HBP and EB, and which may further contain vitamin $B_1$-active substances and/or ingredients and/or so-called excipients. These novel compositions are characterized by the striking potentiation of effect among their ingredients and by the fact that there is no fear of producing "pyrine eruption" or "acetylsalicylic acid eruption" in the use of HBP and EB or the additional vitamin $B_1$-active substances.

HBP, one of the main ingredients of the composition, has the structure

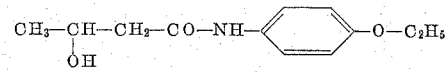

which is a phenetidine derivative. This compound per se has excellent antipyretic and analgetic activities and is of greatly reduced toxicity as compared with phenacetin (=acetophenetidine) as shown below:

(a) ACUTE TOXICITY

Four to six different dosages of compounds were administered to mice each weighing 13–15 grams or to rats each weighing 100–130 grams, using six animals as a group to which a dosage magnitude corresponds, and the numbers of killed animals in each group within 72 hours were counted. According to the Litchfield-Wilcoxon method, the $LD_{50}$ (=50% lethal dose) was calculated from the observed results, the $LD_{50}$ being shown in Table 1:

TABLE 1

| Animal | Mice | | Rats |
|---|---|---|---|
| Administration | Oral, g./kg. | Intraperitoneal, g./kg. | Oral, g./kg. |
| HBP | 4.8 | 0.86 | 7.0 |
| Phenacetin | 1.5 | 0.51 | 3.7 |
| N-acetyl-p-aminophenol | | 0.68 | |

(b) EFFECTIVITY

The medicament to which the threshold amount of morphine hydrochloride (0.0025 g./kg.) has been added was administered intraperitoneally to mice, and analgetic activity was measured according to the Haffner method. From the results, the $ED_{50}$ (=50% effective dose) was calculated according to the Litchfield-Wilcoxon method. The data are shown in Table 2, together with the respective calculated safety margins (=$LD_{50}/ED_{50}$):

TABLE 2

| Compound | $ED_{50}$ g./kg. | Safety Margin |
|---|---|---|
| HBP | 0.046 | 19.7 |
| Phenacetin | 0.066 | 8.9 |
| N-acetyl-p-aminophenol | 0.10 | 6.8 |

HBP per se can be orally administered to the human adult in an amount of 1.0–3.0 grams per day.

EB, i.e. ethoxybenzamide, is a salicylamide derivative having the structure:

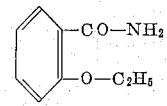

and it has been confirmed that the analgetic activity of this compound is about 2.5 times as much as that of salicylamide, and that, in comparison with salicylamide or acetylsalicylic acid, this EB is not only stronger and more lasting in antipyretic activities but also has less side-effects causing gastric troubles, inappetence, nausea, vomiting, tinnitus, dizziness, etc. Thus the $LD_{50}$ of EB in the mouse or in the rat when administered orally is 1.51 g./kg. or 2.81 g./kg., respectively. The values show that the toxicity of EB is about half as compared with salicylamide, the $LD_{50}$ of which is 0.95 g./kg. or 1.50 g./kg. in the mouse or rat, respectively, under the same conditions as in the case of EB. Usual dosage of EB per se is about 0.5–1.5 grams per day for the human adult.

The characteristic and strong potentiation between HBP and EB in analgetic activity upon which the present invention is based is confirmed, for example, as follows:

In the same way as described supra for HBP, after HBP and EB were concomitantly administered intraperitoneally to mice together with the threshold amount (0.0025 g./kg.) of morphine hydrochloride, the resulting analgetic activity was measured according to the Haffner method. In this test, however, dosages of both HBP and EB were progressively varied so as to show 50% positive activity in the analgetic effect, yielding the result shown in the drawing. In the drawing the dotted line, which shows 50% positive activity of the analgetic effect by the simultaneous administration of HBP and EB, bends remarkably inwardly of the straight line drawn between the $ED_{50}$ point of HBP on the ordinate and the EB point on the abscissa. (The $ED_{50}$ value of HBP is 0.080 g./kg. which somewhat differs from the value cited in Table 2, but this difference is merely due to the different season when the test was carried out and on the strain of mice used in the test.)

The bending inwardly of the straight line shows the potentiation between HBP and EB in the analgetic effect, and the greater bend, the stronger is the potentiating effect. On the contrary, if the dotted line would coincide with the straight line, the effect would only be "additive"; and if the dotted line would bend outwardly of the straight line, the effect would be "antagonistic." (See J. H. Gaddum: "Pharmacology" (fifth edition) published by Oxford University Press in 1959.)

Similar synergism is not observed in other combinations of related compounds, e.g. between HBP and aminopyrine, EB and aminopyrine, HBP and acetylsalicylic acid, EB and phenacetin, EB and N-acetyl-p-aminophenol, acetylsalicylic acid and phenacetin, acetylsalicylic acid and N-acetyl-p-aminophenol, salicylamide and HBP, salicylamide and phenacetin, etc. Nor has the potentiation as observed between HBP and EB been observed in any of the combinations mentioned above. Therefore, the potentiating effect between HBP and EB in analgetic activity is very specific to this combination among combinations between related compounds.

The same inclination between HBP and EB in analgetic activity was observed in tests in accordance with the Haffner method and the D'Amour-Smith method. However, no interaction between HBP and EB in acute toxicity when both are administered concomitantly, is observed. Thus, in case of intraperitoneal administration to the mouse, the $LD_{50}$ of HBP and EB are respectively 0.86 g./kg. and 0.50 g./kg., while the $LD_{50}$ of an equiamount mixture of HBP and EB is 0.69 g./kg. Therefore, notwithstanding the remarkable and characteristic potentiation in analgetic activity, there is no interaction between HBP and EB in acute toxicity; this fact greatly enhances the utility of the concomitant administration of HBP and EB.

The strong analgetic activity of a mixture of HBP and EB is further fortified by the concomitant administration of a vitamin $B_1$-active substance. This can be proved, for example, by comparative clinical tests carried out in a variety of medical fields between formulation A and formulation B, the results being summarized in Table 4, wherein parenthesized figures show percentages relative to totals:

TABLE 3

| Ingredients | Formulation A, mg. | Formulation B, mg. |
|---|---|---|
| HBP | 300 | 300 |
| EB | 300 | 300 |
| Dibenzoyl thiamine | 50 | |
| Caffeine | 50 | 50 |

As shown in Table 4, when a composition consisting of HBP and EB is further compounded with a vitamin $B_1$-active substance, the analgetic effect of the former is remarkably strengthened. It is especially noteworthy that formulation A gave "excellent" effect in cases corresponding to 59.1 percent of those tested, while formulation B did so in 34.1 percent of the cases tested. Therefore, this invention is preferably carried out by compounding HBP, EB and at least one vitamin $B_1$-active substance. The vitamin $B_1$-active substances, used in the present invention, are exemplified by thiamine, diacetyl thiamine, dibenzoyl thiamine, thiamine propyl disulfide, thiamine β-hydroxyethyl disulfide, thiamine allyl disulfide, thiamine tetrahydrofurfuryl disulfide, thiamine disulfide, O-benzoylthiamine disulfide, S-benzoylthiamine O-monophosphate, 7-methoxycarbonyl-hept-2-ene(1) thiamine disulfide, 3-acetylthio-7-methoxycarbonylheptyl thiamine disulfide or their pharmaceutically acceptable salts.

TABLE 4

| Kind of pain | Formulation A | | | | | Formulation B | | | | |
|---|---|---|---|---|---|---|---|---|---|---|
| | Number of cases | Excellent (a) | Effective (b) | Ineffective | Effective rate, (a)+(b) | Number of cases | Excellent (a) | Effective (b) | Ineffective | Effective rate, (a)+(b) |
| Medical Field: | | | | | | | | | | |
| Headache | 71 | 29 (40.8) | 35 (49.3) | 7 (9.9) | (90.1) | 56 | 20 (35.7) | 30 (53.6) | 6 (10.7) | (89.3) |
| Menstural pain | 151 | 81 (53.6) | 47 (31.1) | 23 (15.3) | (84.7) | 12 | 3 (41.7) | 3 (25.0) | 4 (33.3) | (66.7) |
| Neuralgia Myalgia | 47 | 19 (40.4) | 22 (46.8) | 6 (12.8) | (87.2) | 53 | 15 (28.3) | 27 (50.9) | 11 (20.8) | (79.2) |
| Osteocope Arthralgia | 18 | 6 (33.3) | 8 (44.4) | 4 (22.3) | (77.7) | 20 | 6 (30.0) | 5 (25.0) | 9 (45.0) | (55.0) |
| Total | 287 | 135 (47.0) | 112 (39.0) | 40 (14.0) | (86.0) | 141 | 46 (32.6) | 65 (46.1) | 30 (21.3) | (78.7) |
| Dental Field: | | | | | | | | | | |
| Pains after tooth extraction | 96 | 79 (82.3) | 8 (8.3) | 9 (9.4) | (90.6) | 65 | 28 (43.1) | 18 (27.7) | 19 (29.2) | (70.8) |
| Pains after operation | 44 | 33 (75.0) | 7 (16.0) | 4 (9.0) | (91.0) | 26 | 9 (34.6) | 7 (26.9) | 10 (35.3) | (64.7) |
| Toothache | 81 | 53 (65.4) | 16 (19.8) | 12 (14.8) | (85.2) | 85 | 25 (29.4) | 30 (35.3) | 30 (35.3) | (66.5) |
| Total | 221 | 165 (74.7) | 31 (14.0) | 25 (11.3) | (88.7) | 176 | 62 (35.2) | 55 (31.3) | 59 (33.5) | (66.5) |
| Total | 508 | 300 (59.1) | 143 (28.1) | 65 (12.8) | (87.2) | 317 | 108 (34.1) | 120 (37.9) | 89 (28.0) | (72.0) |

The compositions of this invention may contain one or more additional ingredients. These are exemplified by other analgesics such as acetylsalicylic acid, salicylamide, acetanilide, phenacetin, N-acetyl-p-aminophenol, antipyrine, aminopyrine, sulpyrine, isopropylantipyrine, aminopropylone, phenylbutazone, 1,4-diphenyl-3,5-dioxopyrazolidine, or the like; quinoline type derivatives such as quinine hydrochloride, quinine sulfate, quinine ethoxycarbonate, or the like; narcotic and non-narcotic potential analgesics such as codeine phosphate, dextro propoxyphene hydrochloride, or the like; analeptics such as caffeine, amphetamine, methamphetamine, or the like; sedatives such as bromural, phenobarbital, meprobamate, chlorpromazine, or the like; antihistaminics such as diphenhydramine salicylate, chlorpheniramine maleate, or the like; muscle relaxants such as mephenesin, chlorzoxazone, zoxazolamine, carisoprodol, phenylamidol, or the like; and antispasmodics or local anesthetics such as ethyl aminobenzoate, atropine sulfate, scopolia extract, or the like.

Desirable amounts of the respective main ingredients to be compounded into the compositions of this invention vary with such factors as age, sex and symptoms of patients, but usually fall within the range of 0.05 to 3.0 grams of HBP and 0.05 to 3.0 grams of EB per day per 50 kilograms of body weight, and, if desired, a vitamin $B_1$-active substance as mentioned above is compounded in an amount more than 0.025 gram, but not exceeding 1.0 gram, desirably about 0.1 to 0.5 gram per day per 50 kilograms of body weight, with the composition of HBP and EB.

The compositions of the present invention may be administered to patients in the form of such pharmaceutical preparations as powders, granules, tablets, capsules, troches, drops, solutions, injections, emulsions, syrups, elixirs, etc. These preparations can be produced in accordance with per se known manner as those of usual pharmaceutical preparations.

As mentioned in the foregoing description, no potentiation was found between analgetic agents except in the combination of HBP and EB. In addition, the present invention provides a remarkable effect of vitamin $B_1$-active substances on the analgetic agents or their compositions. In other words, when a vitamin $B_1$-active substance is compounded with analgetic compounds or analgetic compositions, according to the present invention, the analgetic activity of the analgesics is remarkably strengthened just as in the case of the composition comprising HBP and EB. Analgetic agents, the effect of which can be fortified with vitamin $B_1$-active substances, may be exemplified by aminobenzene derivatives such as acetanilide, phenacetin, N-acetyl-p-aminophenol, lactylphenetidine, HBP, cinnamoyloxyphenylurea, or the like; salicylic acid derivatives such as sodium salicylate, calcium salicylate, acetylsalicylic acid, calcium acetylsalicylate, aluminium acetylsalicylate, salicylosalicylic acid, salicylamide, EB, sodium gentisate, or the like; pyrazolone-type derivatives such as antipyrine, isopropylantipyrine, aminopyrine, sulpyrine, phenylbutazone, aminopropylone, 1,4-diphenyl-3,5-dioxopyrazolidine, or the like; quinoline derivatives such as quinine hydrochloride, quinine sulfate, quinine ethoxycarbonate or the like; their molecular compounds; their pharmaceutically acceptable salts; or a mixture of two or more kinds of them.

Recapitulating, the invention involves, in one aspect thereof, the mutual potentiation of HBP and EB with respect to their several analgetic activities, a result which has to be regarded as wholly unobvious, unforeseeable and unexpected in view of the absence of such potentiation in the hereinbefore-enumerated combinations of analgetics, and in a second aspect, the potentiation of analgetics generally as well as in combinations thereof, including the special NBP/EB combination of the instant invention, by the concomitant administration—i.e. by the inclusion in the analgetic composition—of a vitamin $B_1$-active substance.

The following examples of presently-preferred typical embodiments of the invention are only for illustration of the latter and are not at all intended to limit or restrict the scope of this invention.

*Example 1*

(Tablets) formulation:  Per table, mg.
HBP _____ 150
EB _____ 150
Dibenzoyl thiamine _____ 25
Caffeine _____ 25
Corn starch _____ 79
Sodium laurylsulfate _____ 2
Ethylcellulose _____ 5
Magnesium stearate _____ 4
                                        ——
                                        440

HBP, EB, dibenzoyl thiamine, caffeine, the major part of the corn starch as such, sodium laurylsulfate and ethylcellulose are admixed, and the remainder of the corn starch as 10%-corn starch paste (aqueous) is added to the mixture. Well kneaded, the mixture is disintegrated and dried in air stream. The dried granules are sprinkled with magnesium stearate and the mixture is punched to make tablets.

These tablets constitute excellent analgetic dosage unit compositions.

In this example, the caffeine may be replaced by 1.25 milligrams of dextro amphetamine sulfate to give essentially the same result.

*Example 2*

(Granules) formulations:  Parts by weight
HBP _____ 300
EB _____ 300
Dibenzoyl thiamine _____ 50
Caffeine _____ 50
Corn starch _____ 296
Sodium laurylsulfate _____ 4
                                        ——
                                        1,000

All ingredients except a part of corn starch are thoroughly admixed, after which the mixture is kneaded with the remainder of the corn starch in the form of a 10%-aqueous paste, followed by granulating and drying in air stream to produce granules, which may be administered in dosage unit form as an analgetic.

*Example 3*

(Capsules) formulation:  Per capsule, mg.
HBP _____ 150
EP _____ 150
Dibenzoyl thiamine _____ 25
Caffeine _____ 25
Lactose _____ 48
Sodium laurylsulfate _____ 2
                                        ——
                                        400

All ingredients are thoroughly admixed and the mixture is packed in gelatine capsules. Each capsule constitutes an excellent analgetically effective single dosage unit.

In this example, the caffeine may be replaced by 1.25 milligrams of methamphetamine hydrochloride to give essentially the same results.

As is manifest from the foregoing examples, the preferred compositions of the invention contain the HBP, the EB, the vitamin $B_1$-active substance and caffeine (as an optional additive) in a 6:6:1:1 ratio by weight, optimum results being thus obtained (cf. also Table 3).

As to details and procedures of Litchfield-Wilcoxon method, Haffner method and D'Amour-Smith method, which are cited hereinbefore, the following references will be helpful for readers' understanding:

(1) Litchfield-Wilcoxon method: The Journal of Pharmacology and Experimental Therapeutics, volume 96, page 99 (1949);
(2) Haffner method: Deutsche Medizinische Wochenschrift, volume 55, page 731 (1929);
(3) D'Amour-Smith method: The Journal of Pharmacology and Experimental Therapeutics, volume 72, page 74 (1941).

Having thus disclosed the invention what is claimed is:
1. An analgetic composition, which comprises, as active ingredients, from 0.05 to 3.0 grams of β-hydroxybutyric acid p-phenetidide per 0.05 to 3.0 grams of ethoxybenzamide, together with pharmaceutically acceptable carrier therefor.

2. An analgetic composition, which comprises from 0.05 to 3.0 grams of β-hydroxybutyric acid p-phenetidide per 0.05 to 3.0 grams of ethoxybenzamide and per 0.025 to 1.0 gram of a vitamin $B_1$-active substance, together with a pharmaceutically acceptable carrier therefor.

3. An analgetic composition, which comprises from 0.05 to 3.0 grams of β-hydroxybutyric acid p-phenetidide per 0.05 to 3.0 grams of ethoxybenzamide and per 0.025 to 1.0 gram of a vitamin $B_1$-active substance and a minor amount, relative to said first two ingredients, of a member selected from the group consisting of caffeine, amphetamine and methamphetamine, together with pharmaceutically acceptable carrier therefor.

4. A composition as claimed in claim 2, wherein the vitamin $B_1$-active substance is dibenzoyl thiamine.

5. A composition as claimed in claim 3, wherein the vitamin $B_1$-active substance is dibenzoyl thiamine.

6. An analgetic composition, which comprises $\beta$-hydroxybutyric acid p-phenetidide, ethoxybenzamide, a vitamin $B_1$-active substance and caffeine in the ratio of 6:6:1:1 on weight basis, together with a pharmaceutically acceptable carrier therefor.

7. An analgetic composition which comprises $\beta$-hydroxybutyric acid p-phenetidide, ethoxybenzamide, a vitamin $B_1$-active substance, and a member selected from the group consisting of amphetamine and methamphetamine in the ratio of 120:120:20:1 on weight basis, together with a pharmaceutically acceptable carrier therefor.

8. A composition as claimed in claim 6, wherein the vitamin $B_1$-active substance is dibenzoyl thiamine.

9. A composition as claimed in claim 7, wherein the vitamin $B_1$-active substance is dibenzoyl thiamine.

10. The method of combating pain which comprises administering to a human or animal requiring relief from pain an analgetic composition, which comprises, as active ingredients, from 0.05 to 3.0 grams of $\beta$-hydroxybutyric acid p-phenetidide per 0.05 to 3.0 grams of ethoxybenzamide, per day per 50 kilograms of body weight.

11. The method of combating pain which comprises administering to a human or animal requiring relief from pain an analgetic composition, with comprises from 0.05 to 3.0 grams of $\beta$-hydroxybutyric acid p-phenetidide per 0.05 to 3.0 grams of ethoxybenzamide and per 0.025 to 1.0 gram of a vitamin $B_1$-active substance, per day per 50 kilograms of body weight.

12. The method of combating pain which comprises administering to a human or animal requiring relief from pain an analgetic composition, which comprises from 0.05 to 3.0 grams of $\beta$-hydroxybutyric acid p-phenetidide per 0.05 to 3.0 grams of ethoxybenzamide and per 0.025 to 1.0 gram of a vitamin $B_1$-active substance and a minor amount, relative to said first two ingredients, of a member selected from the group consisting of caffeine, amphetamine and methamphetamine, per day per 50 kilograms of body weight.

References Cited by the Examiner

UNITED STATES PATENTS 2,830,087  4/1958  Ehrhart et al. _____ 260—562

OTHER REFERENCES

Chem. Abstracts, vol. 52, p. 20687e (1958), "Analgesic Activity of Some Salicylamide Derivatives."

Wilson, American Drug Index (1958), pp. 76 and 606. J. B. Lippincott Co.

JULIAN E. LEVITT, *Primary Examiner.*

M. J. COHEN, *Assistant Examiner.*

UNITED STATES PATENT OFFICE
CERTIFICATE OF CORRECTION

Patent No. 3,284,298                                  November 8, 1966

Hajime Fujimura et al.

It is hereby certified that error appears in the above numbered patent requiring correction and that the said Letters Patent should read as corrected below.

In the heading to the printed specification, lines 3, 4 and 5, for "Hajime Fujimura, 9-2 Shishigatani-shimo-miyanomae-cho, Sakyo-ku, Kyoto, Japan, and Kazuo Shinozaki, 10 Izumi-cho, Nishinomiya, Hyogo, Japan" read -- Hajime Fujimura, Kyoto, Japan, and Kazuo Shinozaki, Hyogo, Japan, assignors to Takeda Chemical Industries, Ltd., Higashi-ku, Osaka, Japan --.

Signed and sealed this 12th day of September 1967.

(SEAL)
Attest:

ERNEST W. SWIDER                                EDWARD J. BRENNER
Attesting Officer                                    Commissioner of Patents